United States Patent

[11] 3,572,740

| [72] | Inventor | Donald F. Rypinski |
| | | 2315 1/2 Glenneyre, Laguna Beach, Calif. 92651 |
| [21] | Appl. No. | 28,165 |
| [22] | Filed | Apr. 10, 1970 |
| [45] | Patented | Mar. 30, 1971 |
| | | Continuation of application Ser. No. 717,254, Mar. 29, 1968, now abandoned. |

[54] COLLAPSIBLE SAIL-PROPELLED VEHICLE
12 Claims, 12 Drawing Figs.

[52] U.S. Cl. .................................................. 280/16, 280/36
[51] Int. Cl. .................................................. B62b 13/04
[50] Field of Search .......................................... 280/16, 12, 2, 150, 36, 213; 180/2, 25 (A); 296/102

[56] References Cited
UNITED STATES PATENTS
| 3,084,949 | 4/1963 | Forster ......................... | 280/36 |
| 3,143,357 | 8/1964 | Krupnik ....................... | 280/16 |
| 3,402,941 | 9/1968 | Martinmaas ................... | 280/150 |

FOREIGN PATENTS
| 460,911 | 10/1913 | France ......................... | 180/2 |
| 1,175,929 | 11/1958 | France ......................... | 280/213 |

*Primary Examiner*—Leo Friaglia
*Assistant Examiner*—Robert R. Song
*Attorney*—Christie, Parker & Hale ABSTRACT: An iceboat or a wheeled land yacht for use on a hard surface and propelled by a sail. A metal-tube frame of the vehicle is assembled using pivoted connections and easily releasable fasteners, permitting the frame to be quickly collapsed for compact shipment or storage. A cockpit is formed from a flexible and foldable material such as canvas which is suspended in hammock fashion within the frame. The frame includes a roll bar to provide protection for an occupant if the vehicle capsizes. The frame carries two aft-mounted wheels or runners, and a single wheel or runner is centrally and steerably mounted at a forward end of the frame. A mast and sail are secured to and extend above the frame.

INVENTOR.
DONALD F. RYPINSKI
BY
Christie, Parker & Hale
ATTORNEYS.

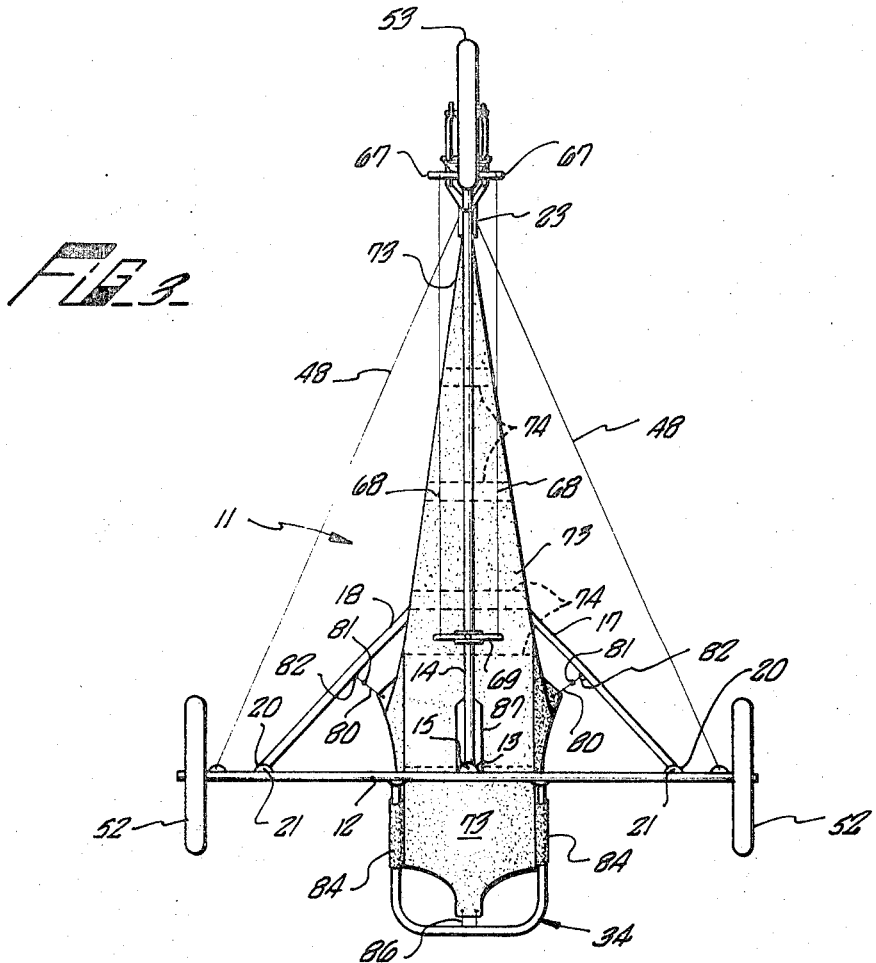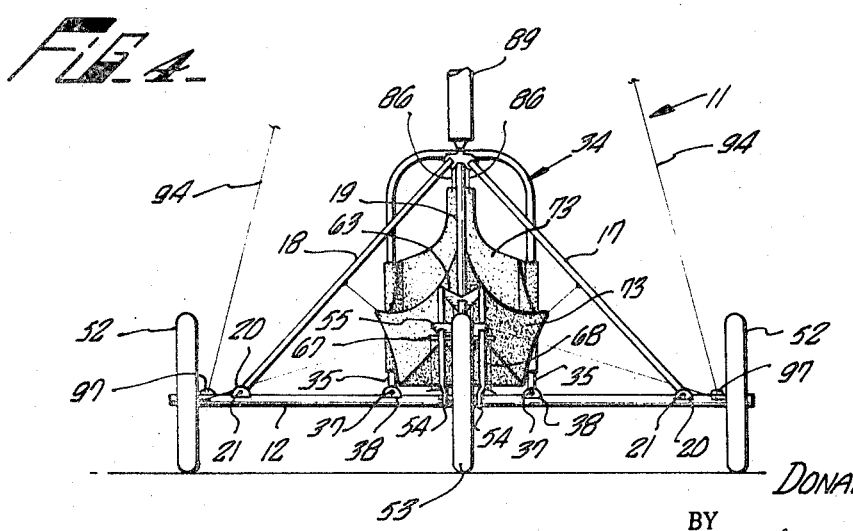

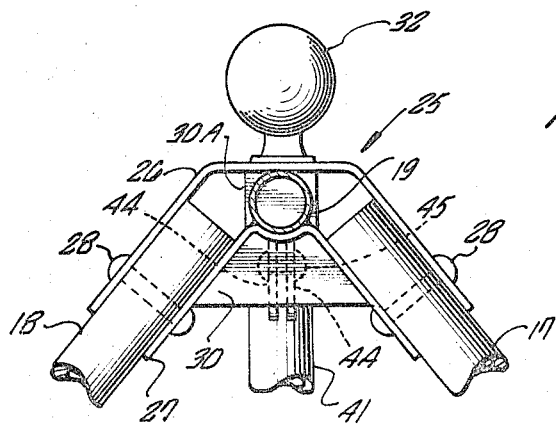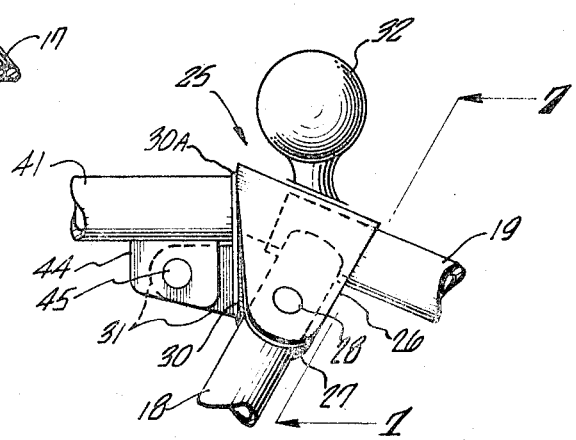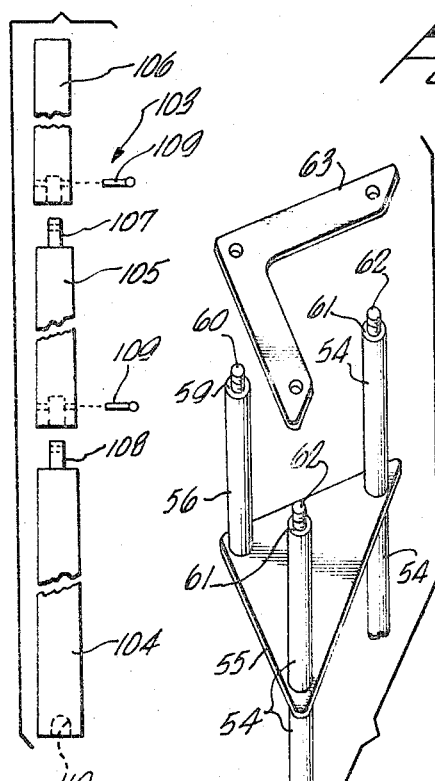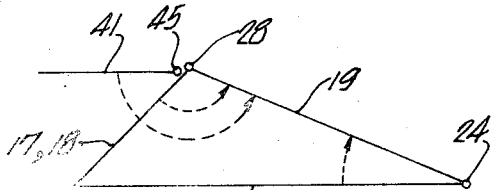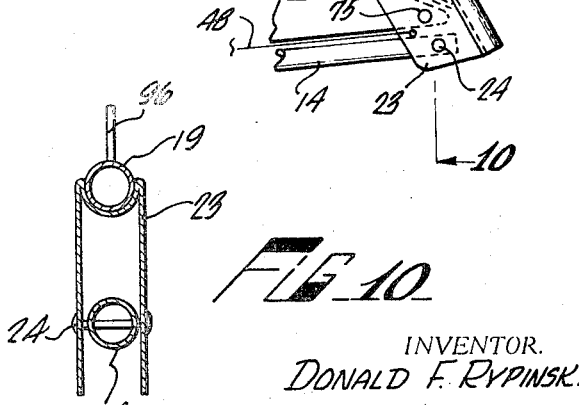

3,572,740

COLLAPSIBLE SAIL-PROPELLED VEHICLE

This application is a continuation of Ser. No. 717,254, filed Mar. 29, 1968, and now abandoned.

BACKGROUND OF THE INVENTION

This invention relates to a vehicle or craft which is operated on land or ice, and is propelled by a sail in much the same fashion as a sailboat. Iceboats of this general type have been used for many years, and a more recent development is a "land yacht" in which the vehicle is supported by wheels for operation on a beach, dry lake, road, or other solid surface. The invention will be described in terms of a land yacht, but it is equally useful when provided with conventional iceboat runners for operation on ice.

Land yachts or iceboats of known types typically have a rigid fuselage or hull which is not adapted to be collapsed for compact storage and shipment, other than perhaps providing a removable mast and sail. These vehicles are relatively large, and must be carried in specially designed trailers when the user moves the craft to a new location. This problem is especially provoking with land yachts which are often transported by the owner to a remote desert or dry lake for a day of sailing, and then returned to the owner's home for storage.

My design obviates the need for expensive and bulky custom trailers by providing a hull frame formed of metal tubes which are pivotally and releasably interconnected such that the frame can be quickly and easily collapsed into a compact package. All of the components of the vehicle can be carried by a passenger automobile, and no trailer is needed. Furthermore, the hull frame is inexpensively constructed from readily available materials, is light in weight, and is structurally strong.

The vehicle occupant sits in a flexible cockpit formed of canvas or the like, and the cockpit and occupant are cradled within the metal-tube frame which provides considerable protection if the vehicle capsizes. The canvas cockpit folds into a compact bundle when the vehicle is dismantled. The frame includes a braced roll bar which extends above the occupant to protect the head and upper body if the vehicle is accidentally upset.

A steerable front wheel is removably mounted at the front of the frame, and a pair of steering cables extend rearwardly to a control handle in the cockpit. A pair of laterally spaced rear wheels are rotatably mounted at the aft end of the frame. One or more of the wheels is equipped with a brake to provide control over vehicle speed, and to assist in anchoring the assembled vehicle when it is not being sailed. A mast is removably secured at the top of the frame by a ball-socket joint, and a conventional sail is carried by the mast.

The vehicle is aerodynamically clean, and is capable of high-speed travel in moderate winds. Operation is simple, and the occupant is surrounded by protective structure should an upset occur at high speed. The open-frame design of the craft simplifies and reduces cost of construction, and repairs or modifications are readily performed by the owner. An outstanding feature of the design is that it can be easily assembled or dismantled by one person in a short period of time for operation, transportation or storage.

SUMMARY OF THE INVENTION

The sail-propelled vehicle of this invention is intended for operation on a solid surface, and has a frame formed of a plurality of demountable and foldable elongated members. The frame has a rear lateral member and a longitudinal member which are secured together by a first attachment means such as a clevis and clevis pin. A pair of rear struts are secured adjacent opposite ends of the lateral member, and the rear struts extend toward each other and upwardly and forwardly from the lateral member. A forward strut is secured at the front end of the longitudinal member, and it extends upwardly and rearwardly to be joined to the upper ends of the rear struts by a coupling means. A flexible, foldable material is attached to the frame in hammock fashion, and is arranged to define a cockpit and seating support for the vehicle occupant. A sail-carrying mast is secured to and extends upwardly from the frame. Support means such as wheels or iceboat runners are secured to and extend downwardly from the frame to support the vehicle for movement along the solid surface.

Preferably, the frame includes a U-shaped roll bar with legs extending upwardly from the rear lateral member. A second attachment means is used for releasably securing together the roll-bar legs and the lateral member. A brace strut is secured to and extends between the coupling means and an upper bight portion of the roll bar.

Preferably, the coupling means which secures together the forward, rear and brace struts includes a plurality of pivot pins whereby these struts are pivotally or foldably secured together. Similarly, the forward strut and longitudinal member are preferably pivotally secured together so they can be folded, and a third attachment means is used to releasably secure together the rear struts and lateral member.

Collapsibility of the vehicle is enhanced by providing a fourth attachment means for releasably securing the forward end of the cockpit to the frame. A fifth attachment means is similarly provided for attaching the brace strut to the upper part of the roll bar. In one form, the vehicle frame includes a ball-socket mounting means for rotatably and selectively releasably securing the mast to the frame.

BRIEF DESCRIPTION OF THE DRAWINGS

The invention will be described in detail with reference to the attached drawings, in which:

FIG. 3 is a bottom view of the vehicle;

FIG. 4 is a front view of the vehicle;

FIG. 6 is a right side view of a strut-coupling assembly;

FIG. 7 is a view on line 7—7 of FIG. 6;

FIG. 8 is a schematic drawing of a frame for the vehicle, showing the folding geometry of the various frame members;

FIG. 9 is a right side view of a forward frame-member coupling assembly;

FIG. 10 is a view on line 10—10 of FIG. 9;

FIG. 11 is a perspective view of a portion of a front-wheel mounting assembly; and FIG. 12 is an elevation of a demountable mast for the vehicle.

DESCRIPTION OF THE PREFERRED EMBODIMENTS

Figure 1:
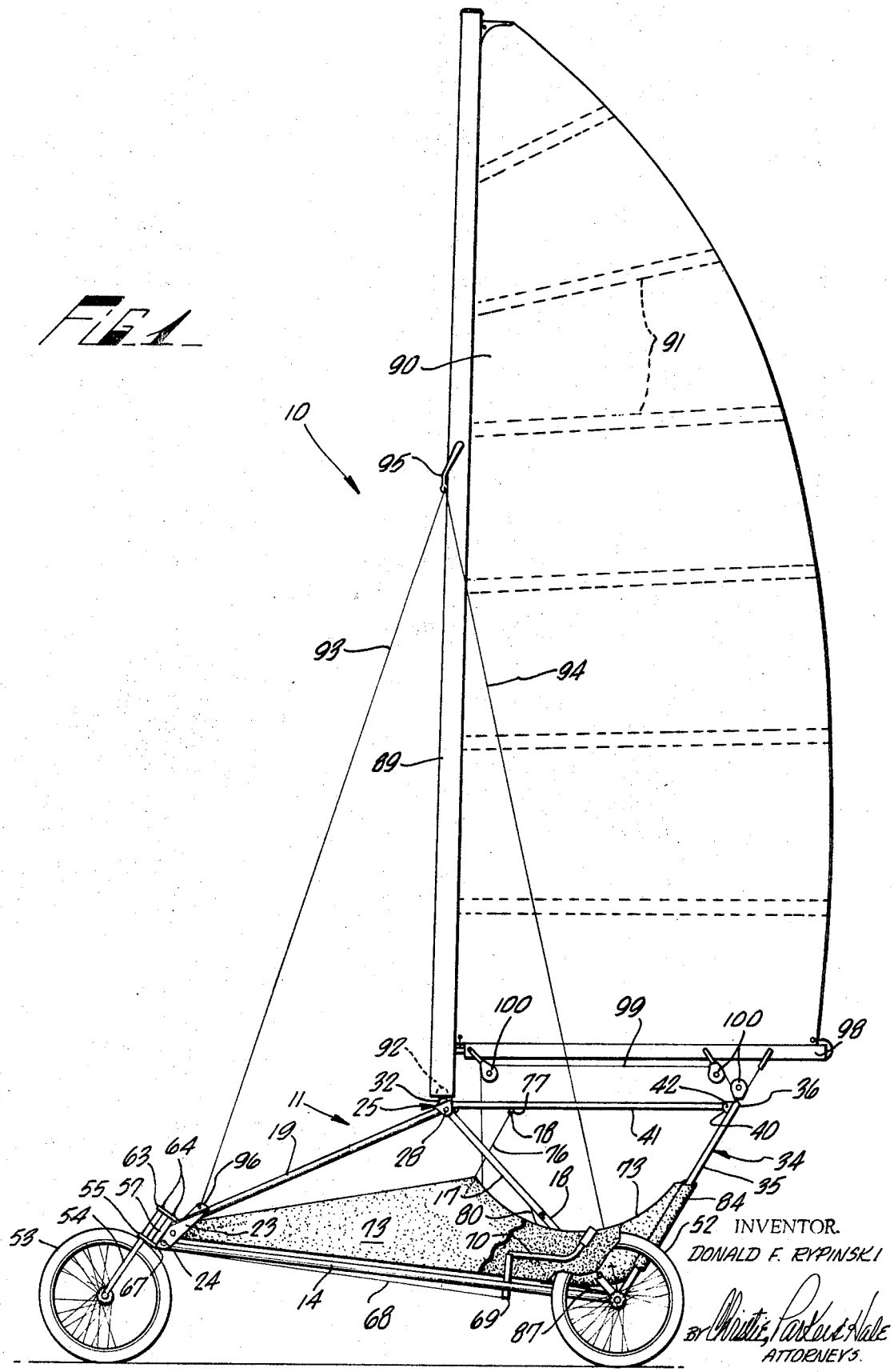
FIG. 1 is a left side elevation, partly broken away in the rear cockpit area, of a land-yacht vehicle constructed according to the invention.
Figure 2:
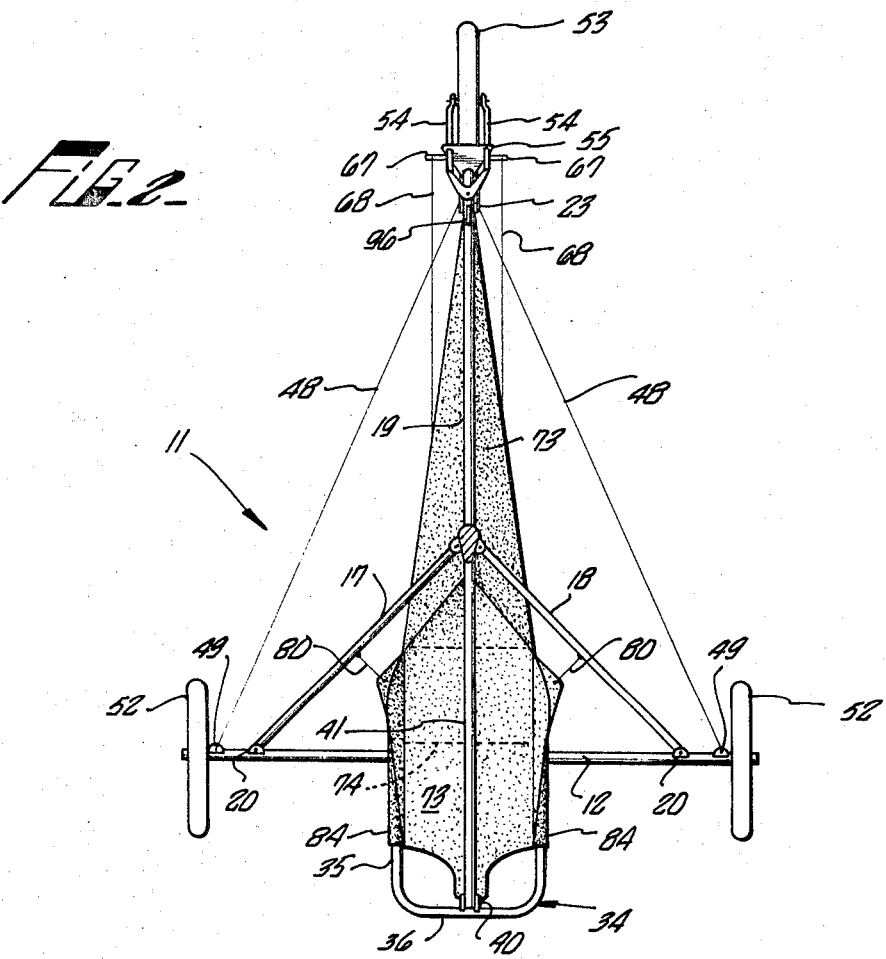
FIG. 2 is a top view of the vehicle before mounting of a sail-carrying mast.
Figure 5:
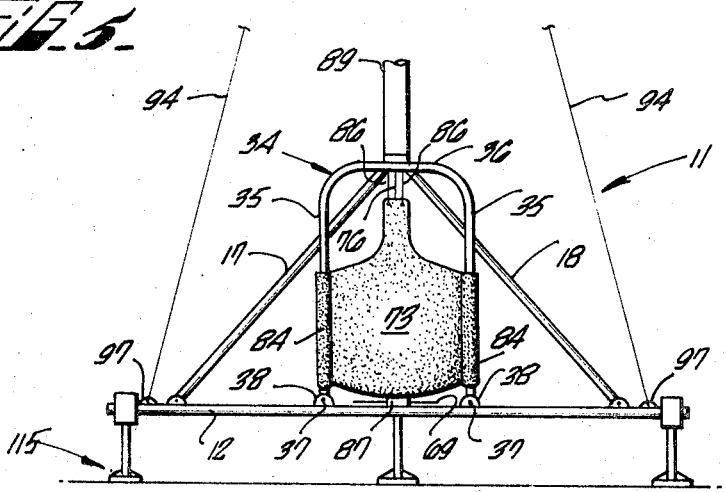
FIG. 5 is a rear view of the vehicle with iceboat runners installed in place of wheels.

Referring to FIGS. 1—5, a sail-driven land-yacht vehicle 10 according to the invention has a frame 11 assembled from a plurality of tubular-steel members. The frame includes an elongated rear lateral member 12 having a centrally positioned U-shaped bracket or clevis 13 welded thereto. An elongated longitudinal member 14 is releasably secured in clevis 13 by a conventional readily removable clevis pin 15, and member 14 extends forwardly from the rear lateral member to form a T-shaped underframe as best seen in FIG. 3.

A mast-supporting upper frame for the vehicle is defined by a pair of rear members or struts 17 and 18, and a forward member or strut 19. Rear struts 17 and 18 are releasably secured adjacent opposite ends of rear lateral member 12 by a pair of clevises 20 welded to lateral member 12 and including conventional quick release clevis pins 21. The rear struts are oriented to extend toward each other and upwardly and forwardly away from the rear lateral member.

Forward strut 19 is pivotally secured at its front end to the front end of longitudinal member 14 by a generally U-shaped bracket 23 welded to the forward strut as best seen in FIGS. 9—10. A pivot pin 24 is secured to the legs of bracket 23, and extends through a lateral hole in the front of longitudinal member 14 to secure this member pivotally to the bracket and forward strut 19. The forward strut extends upwardly and rearwardly from the front of the longitudinal member toward the upper ends of rear struts 17 and 18.

A coupling means such as a multiple-clevis bracket 25 is welded to the upper end of forward strut 19 as best seen in FIGS. 6—7. Bracket 25 includes an upper plate 26 welded to the top of forward strut 19, and a lower plate 27 welded to the underside of the upper end of the forward strut. The ends of the upper and lower plate are bent downwardly to define a pair of clevises which receive rear struts 17 and 18. The rear struts are pivotally secured to these clevises by a pair of pivot pins 28.

A flat stiffening plate 30 is welded across the back of lower plate 27, and a narrow central portion 30A of plate 30 extends upwardly to be welded to the back of upper plate 26. The clevises formed by plates 26 and 27 are not covered by plate 30 to avoid any interference with the ends of the rear struts when these struts are folded as described below. A tongue 31 is welded to and extends rearwardly from the stiffening plate. A mounting ball 32, such as a trailer-hitch ball, is welded to the top of upper plate 26. Ball 32 serves as a portion of a ball-socket joint used to mount a mast on the vehicle.

A generally U-shaped roll bar 34 is included in the frame to provide additional protection for the vehicle in the frame to provide additional protection for the vehicle occupant. The roll bar has a pair of downwardly extending legs 35 which are joined at their upper ends by a bight portion 36. The lower ends of legs 35 are removably secured to rear lateral member 12 by a pair of readily releasable clevis pins 37 inserted through a pair of laterally spaced clevises 38 welded to the rear lateral member.

A clevis 40 is welded to the center of bight portion 36 of the roll bar, and a brace strut 41 is releasably secured to clevis 40 by a readily removable clevis pin 42. Brace strut 41 extends forwardly to terminate adjacent the rear of stiffening plate 30 on bracket 25. A pair of downwardly extending ears 44 (see FIGS. 6—7) are welded to the underside of the front end of the brace strut, and the ears make a slip fit over opposite sides of tongue 31 which extends rearwardly from the stiffening plate. A pivot pin 45 passes through tongue 31 and ears 44 to provide a pivotal attachment of the brace strut to bracket 25 and to the other struts in the frame. Additional stiffening of the frame is provided by a pair of wire stays 48 (omitted in FIG. 1 for clarity) releasably clipped to bracket 23 and extending rearwardly and outwardly to a pair of ears 49 welded at opposite ends of the rear lateral member.

A pair of rear wheels 52 are rotatably and releasably secured at opposite ends of rear lateral member 12. A front wheel 53 is rotatably carried by a fork formed by a pair of bars 54. As best seen in FIG. 11, bars 54 are welded to and passed upwardly through a triangular plate 55 which has a king pin 56 welded to and extending upwardly from the rear end thereof. King pin 56 in turn makes a rotatable slip fit through a hollow tube 57 welded to the front of U-shaped bracket 23 and forward strut 19 (see FIGS. 1 and 9).

The upper end of the king pin has an annular shoulder 59, and a threaded stud 60 extends upwardly from the shoulder. Similarly, the upper ends of bars 54 of the front-wheel fork have annular shoulders 61 from which threaded studs 62 extend. A cover plate 63 fits over the studs and is secured against the annular shoulders 59 and 61 by nuts 64.

As best seen in FIG. 1, tube 57 (which mounts the front wheel assembly on the frame) is positioned to define a relatively steep caster angle for the steerable front wheel. A pair of steering-wire tabs 67 (FIG. 2) extend laterally from opposite sides of triangular plate 55 on the front-wheel fork, and a pair of steering wires 68 are releasably clipped to the tabs. The steering wires extend rearwardly on opposite sides of longitudinal member 14 of the frame to be secured to opposite ends of a laterally extending steering bar 69 which is pivotally secured to member 14. The steering bar is in turn rigidly secured to a steering control stick 70 which extends upwardly and then rearwardly to provide leverage for steering control of the front wheel.

A flexible and foldable material 73 such as canvas is suspended within the frame to define a partially enclosed cockpit for the occupant of the vehicle. The bottom or floor of the cockpit material has pockets formed therein to receive stiffening battens 74 to flatten this surface. The forward part of the cockpit is formed as a closed tapering shell which is secured at its forward end by a releasable pin 75 to U-shaped bracket 23. The upper end of the closed portion of the cockpit is suspended by a wire cable 76 from brace strut 41, the cable being releasably secured to an ear 77 on the brace strut by a conventional snap hook 78.

The aft part of the cockpit is open at its upper end, and the sides of this open portion are suspended from rear struts 17 and 18 by a pair of cables 80 having snap hooks 81 which engage ears 82 on the rear struts. A pair of laterally spaced pockets 84 are formed at opposite rear corners of the cockpit, and legs 35 of the roll bar extend through these pockets to support the cockpit. The rear of the cockpit extends upwardly between the legs of the roll bar, and is suspended from a cable 86 secured to bight portion 36 of the roll bar.

Preferably a strap 87 is secured by stitching or the like to the rear central part of the cockpit floor. The aft end of the strap is fastened to rear lateral member 12 by clevis pin 15 which also secures the rear lateral member to longitudinal member 14. The purpose of the strap is to hold the bottom of the cockpit downwardly within the frame in the event the vehicle should capsize. A conventional safety belt (not shown) is secured in the cockpit to hold the occupant in place during an overturning accident. Alternatively, the safety belt may be further anchored by securing it to one or more of the various frame members or struts.

A mast 89 of the conventional type used on sailboats carries a sail 90 which has the usual stiffening battens 91 and associated conventional hardware for raising and lowering the sail on the mast. A socket 92 is formed at the bottom of the mast to receive mounting ball 32 of the frame. The socket is preferably of the type used on trailer hitches so it may be releasably locked in engagement with the ball. This type of mounting is particularly useful with masts having an oval cross section as the mast can rotate or weathercock into the relative wind to minimize aerodynamic drag when the vehicle is in motion.

A wire forestay 93 and a pair of aft wire shrouds 94 are secured to an attachment bracket 95 mounted partway up the mast. The lower end of the forestay is releasably secured by a snap hook to a tab 96 welded to the front of forward strut 19. Shrouds 94 are similarly secured by snap hooks to tabs 97 welded adjacent opposite ends of rear lateral member 12 of the frame.

Sail 90 has a conventional boom 98 which fits in a track (not shown) in the mast. A control line or main sheet 99 is secured to the boom, and passes through a series of blocks 100 (one of which is releasably clipped to bight portion 36 of the roll bar) to extend into the forward end of the cockpit. The main sheet is extended or retracted in conventional fashion by the vehicle occupant to control the trim of sail 90.

When disassembled for shipment or storage, vehicle 10 breaks down into a number of compact, easily handled subassemblies. The roll bar is also released from the frame by removing pin 75 and releasing the several snap hooks which suspend the cockpit by cables from the frame struts. The entire cockpit is then folded into a compact flat bundle which can be placed between the legs of the roll bar.

The sail is removable from the mast in conventional fashion, and the mast (with its associated stays and shrouds) is uncoupled from the frame by releasing the ball-socket joint at its lower end. The front wheel assembly is removed from the frame by removing cover plate 63 and sliding king pin 56 out of tube 57. Rear axle or lateral member 12 is removed from the frame by removing clevis pins 15 and 21, and by unclipping wire stays 48. Depending upon the amount of storage room available, the rear wheels may be removed from the rear lateral member, or they may be left in place.

The remaining frame members and struts are coupled together in such a way that the frame can be folded into a compact bundle. The folding geometry of the frame is shown in schematic form in FIG. 8. Forward strut 19 is held stationary, and rear struts 17 and 18 folded forwardly and inwardly about pivot pins 28 until they lie against and parallel to the forward strut. Brace strut 41 is pivoted downwardly and forwardly around pin 45 until it extends parallel to forward strut 19. As best seen in FIG. 7, the axis of pivot pin 45 is located beneath the axis of forward strut 19 to enable folding of the brace strut without any interference with the forward strut or the various members of bracket 25. Finally, longitudinal member 14 is pivoted upwardly around pin 24 to lie parallel to the folded front, rear and brace struts.

Struts 17, 18, 19, 41 and member 14 are thus all parallel and pivotally connected when collapsed as just described. An alternative folding arrangement is to keep the roll bar in engagement (by pin 42) with the brace strut. The roll bar and the folded cockpit are then pivoted around pin 42 until legs 35 lie parallel to the folded struts and longitudinal member.

Assembly of the vehicle is accomplished by reversing the derigging steps just described. The assembly procedure is quick and simple, and can be accomplished by one person. The vehicle is thus capable of being transported by an ordinary passenger car to a remote site for a day of sailing, and then quickly dismantled and returned to the owner's home for storage.

Only mast 89 is too large to be carried inside a conventional passenger car, and the mast can be easily mounted on a conventional rack carried on the car top. Alternatively, a demountable mast 103 as shown in FIG. 12 may be used on the vehicle. Mast 103 is formed in three sections 104, 105 and 106 which are joined by telescoping joints 107 and 108 and secured together by pins 109. A socket 110 is formed in the bottom of the mast to receive mounting ball 32 as described above in connection with mast 89. The usual track (not shown) is provided in the mast to receive the sail and boom, or, alternatively, a "sock" sail (not shown) having a pocket at its forward end may be slipped over the mast.

A vehicle which has been constructed in accordance with the invention has an overall height (to the mast top) of 22 feet, a wheel base of slightly under 9 feet, and an overall length of slightly under 14 feet. A sail with an area of about 88 square feet is used. The various frame members and struts are made from steel tubing having an outside diameter of 1¼inches. Wheels as used on horseracing sulkies have been found to be especially suit able for the vehicle. One or more of the wheels is preferably equipped with a mechanical or hydraulic brake which is actuated by a cockpit handgrip control (not shown) secured to steering control stick 70. The brake is useful for avoiding excessive speeds, and for preventing unwanted movement of the vehicle when it is parked. The brake components are conventional, and, for brevity, will not be described in detail.

The releasable pins used as attachment means to secure together the various components of the vehicle may be of conventional types which are locked in place by nuts or safety pins. Preferably, quick-release ball-detent pins are used for easy assembly and disassembly. Such pins are commercially available, and are described at pages 77—78 of the Jun. 15, 1967 issue of "Machine Design."

There has been described a sail-driven vehicle which is characterized by collapsibility for compact storage and which can be quickly and easily assembled. The collapsibility of the vehicle is greatly enhanced by the foldable material which forms the cockpit, The assembled vehicle is characterized by excellent structural strength and provides good protection for the occupant when the vehicle is in motion.

Although the vehicle has been described in terms of being supported by rotatable wheels for operation on land, it is to be understood that the concept of the invention also extends to the vehicle as used as an iceboat. In this application of the design, the forward and rear wheels are replaced by conventional iceboat runners 115 (see FIG. 5) which are secured to the frame by conventional attachment fittings. It is intended that both the iceboat and land-yacht versions of the invention be encompassed within the scope of the following claims which define the invention in detail.

I claim:

1. A sail-propelled vehicle for operation on a solid surface, comprising:

a frame having an elongated rear lateral member, an elongated longitudinal member extending forwardly from the lateral member, first attachment means for releasably securing together the lateral and longitudinal members, a pair of rear struts secured adjacent opposite ends of the lateral member and extending toward each other and upwardly and forwardly from the lateral member, a forward strut secured adjacent a forward end of the longitudinal member and extending upwardly and rearwardly toward upper ends of the rear struts, and coupling means for securing together upper ends of the forward and rear struts;

a seat member attached to the frame and arranged to support and occupant of the vehicle;

a sail-carrying mast secured to and extending upwardly from the frame; and support means secured to and extending downwardly from the frame to support the vehicle for movement along the solid surface.

2. The vehicle defined in claim 1 in which the frame includes a generally U-shaped roll bar with legs extending upwardly from the rear lateral member, second attachment means for releasably securing together the roll-bar legs and the lateral member, and a brace strut secured to and extending between the coupling means and an upper portion of the roll bar.

3. The vehicle defined in claim 1 in which the support means comprises a pair of laterally spaced rear wheels rotatably mounted on opposite sides of the frame, and a front wheel steerably and rotatably mounted on the frame forwardly of the rear wheels.

4. The vehicle defined in claim 1 in which the support means comprises first and second laterally spaced iceboat runners mounted on opposite sides of the frame, and a third iceboat runner mounted on the frame forwardly of the first and second runners.

5. The vehicle defined in claim 2 in which the coupling means includes pivot means for pivotally securing together the forward, rear and brace struts, and further comprising second pivot means for pivotally securing together the forward strut and longitudinal member, and third attachment means for releasably securing together the rear struts and lateral member whereby the several strut members and the longitudinal member are foldable together to be oriented in parallel relation.

6. The vehicle defined in claim 5 in which the seat member is a flexible, foldable material defining a cockpit with a closed forward end for partially enclosing the vehicle occupant, and further comprising fourth attachment means for releasably securing the forward end of the cockpit to the frame, and fifth attachment means for releasably attaching the brace strut to the upper portion of the roll bar.

7. The vehicle defined in claim 5 and further comprising a selectably releasable mounting means for rotatably securing the mast to the frame.

8. The vehicle defined in claim 2 in which the seat member is a flexible, foldable material formed to define a cockpit for partially enclosing the occupant.

9. A sail-propelled vehicle for operation on a solid surface, comprising: of rear secured adjacent a frame having an elongated rear lateral member, an elongated longitudinal member extending forwardly form the lateral member, first attachment means for releasably securing the longitudinal member to the lateral member between the ends of the lateral member a pair of rear struts secured adjacent opposite ends of the lateral member and extending toward each other and upwardly from the lateral member, a forward strut secured adjacent a forward end of the longitudinal member and extending upwardly toward upper ends of the rear struts, and coupling means for securing together upper ends of the forward and rear struts, the frame being collapsible for storage into a configuration in which the members and struts are oriented substantially parallel to each other;

a foldable seat member attached to the frame and arranged to support an occupant of the vehicle;

a sail secured to the frame; and support means secured to the frame to support the vehicle for movement along the solid surface.

10. The vehicle defined in claim 9 in which the seat member is a flexible material formed to define a cockpit for partially enclosing the occupant.

11. The vehicle defined claim 9 in which the support means comprises a pair of laterally spaced rear wheels rotatably mounted on the rear lateral member at opposite sides of the frame, and a single front wheel steerably and rotatably mounted on the frame forwardly of the rear wheels.

12. The vehicle defined in claim 11 in which the forward and rear struts are rigid, and further comprising a pair of stays respectively connected adjacent opposite ends of the lateral member and extending forwardly to be connected adjacent the forward end of the longitudinal member.

PO-1050
(5/69)

UNITED STATES PATENT OFFICE
CERTIFICATE OF CORRECTION

Patent No. 3,572,740            Dated March 30, 1971

Inventor(s) Donald F. Rypinski

It is certified that error appears in the above-identified patent and that said Letters Patent are hereby corrected as shown below:

Column 3, lines 27-28, delete "in the frame to provide ad tional protection for the vehicle". Column 4, line 64, a "is" insert -- removed by releasing clevis pins 37 and 42 The cockpit is --. Column 5, line 8, after "18" insert -- are --; line 52, change "suit able" to -- suitable --. Column 6, line 26, claim 1, change "and" to -- an --; lin 73, claim 9, delete "of rear secured adjacent". Column 7 line 3, claim 9, after "member" insert -- , [comma] --. Column 8, line 5, claim 11, after "defined" insert -- in Signed and sealed this 24th day of August 1971.

(SEAL)
Attest:

EDWARD M. FLETCHER, JR.          WILLIAM E. SCHUYLER, JR.
Attesting Officer                Commissioner of Patents